United States Patent [11] 3,630,703

| [72] | Inventor | David Jones<br>St. Helens, England |
| --- | --- | --- |
| [21] | Appl. No. | 788,725 |
| [22] | Filed | Jan. 3, 1969 |
| [45] | Patented | Dec. 28, 1971 |
| [73] | Assignee | Pilkington Brothers Limited<br>Liverpool, England |
| [32] | Priority | June 19, 1968 |
| [33] | | Great Britain |
| [31] | | 29,189/68 |

[54] FLOAT GLASS METHOD AND APPARATUS FOR SUPPLYING MODIFYING MATERIAL TO THE GLASS SURFACE
7 Claims, 4 Drawing Figs.

[52] U.S. Cl. .................................................. 65/30,
65/60, 65/99 A, 65/182 R
[51] Int. Cl. ...................................................... C03b 18/00

[50] Field of Search............................................ 65/99, 182, 60; 228/14, 25

[56] References Cited
UNITED STATES PATENTS
| 3,379,355 | 4/1968 | Bobrowski.................. | 228/25 |
| 3,467,508 | 9/1969 | Loukes et al. ................ | 65/99 X |

Primary Examiner—S. Leon Bashore
Assistant Examiner—J. B. Hardaway
Attorney—Burns, Doane, Swecker & Mathis ABSTRACT: Float glass having a desired characteristic is manufactured by advancing the glass beneath a body of molten material which modifies the glass to produce the characteristic, and feeding a strip of replenishing material to the glass surface upstream of the body so that the end of the strip melts on to the glass surface and the molten material is carried into the molten body as the glass advances.

PATENTED DEC 28 1971

Inventor

By

Attorneys

PATENTED DEC 28 1971

Inventor
David Jones
By
Morrison, Kennedy & Campbell
Attorneys

FLOAT GLASS METHOD AND APPARATUS FOR SUPPLYING MODIFYING MATERIAL TO THE GLASS SURFACE

CROSS-REFERENCE TO RELATED APPLICATIONS

This invention is a modification of the invention described and claimed in copending application Ser. No. 786,722, filed Dec. 24, 1968.

BACKGROUND OF THE INVENTION

This invention relates to the manufacture of glass having predetermined surface characteristics.

It has bee proposed to impart desired surface characteristics to glass by maintaining a body of molten material which modifies the glass in contact with a surface of the glass, while moving the glass relatively to said body so as to renew continuously the surface in contact with said body.

The surface of the glass is modified by causing controlled migration of an element from the molten material into the surface of the glass. The modification of the glass is controlled by controlling the oxidation conditions at the interface between the molten material and the glass or by passing a controlled electric current between the body of molten material and the glass.

As this migration proceeds, it is necessary to replenish the material in the body, and a chief object of the present invention is to provide an improved method and apparatus for replenishing the body of molten material.

SUMMARY

According to the invention a method of manufacturing glass having desired characteristics other than those inherent in the method of forming the glass comprise maintaining a body of molten material which modifies the glass to produce the desired characteristics in contact with a surface of the glass which is at a temperature above the melting point of the material, moving the glass and said body relatively so as to renew continuously the surface in contact with said body, and feeding a strip of replenishing material to the surface of the glass upstream of said body so that said replenishing material melts on to the glass surface and is carried by the glass into said body as the glass advances.

Preferably the body of molten material is maintained in contact with the surface of the glass by causing said body to cling to a locating member juxtaposed to said surface, and the replenishing material in preferably fed to the surface of the glass in the form of a continuous strip.

The strip of replenishing material is preferably cooled along its length, except at the end adjacent the glass surface, to confine melting of the material to said end of the strip.

In a preferred embodiment of the invention the strip of replenishing material is fed continuously at a controlled rate to the glass surface The invention is particularly, but not exclusively, applicable to the manufacture of flat glass. According, therefore, to the invention a method of manufacturing flat glass having desired surface characteristics comprises maintaining a body of molten material which modifies the glass in contact with the upper surface of a ribbon of glass being advanced in a horizontal plane, and which is at a temperature above the melting point of said material, and feeding replenishing material on to the ribbon surface upstream of said body from a continuous strip of said material, so that said material from the trip melts at the ribbon surface and is incorporated in said body as the ribbon advances.

The material is preferably fed to the ribbon surface at a selected position transversely of the ribbon.

The invention also provides apparatus for use in the manufacture of flat glass having desired surface characteristics, comprising a support upon which a ribbon of glass may be advanced, heaters associated with the support for thermally conditioning the advancing glass, locating means mounted transversely of the support so as to be just above the path of travel of the upper surface of the advancing ribbon of glass, and means for supplying molten material to a body of molten material which is held by the locating means in contact with the said upper surface, said supplying means including a replenishing duct terminating just above the path of travel of the upper surface of the ribbon upstream of the locating means, and means for feeding a continuous strip of replenishing material through said duct and on to the said upper surface, so that said material melts at the ribbon surface and is incorporated in said body as the ribbon advances.

Preferably the duct is surrounded by a jacket and means are provided for circulating a coolant through said jacket so as to ensure that melting of the strip of said replenishing material is confined to the end of the strip at the ribbon surface.

Means are preferably provided for advancing the strip of replenishing material continuously along the duct at a controlled rate. The strip-advancing means may, for example, comprise a pair of nip rollers, at least one of which is driven, which are arranged to grip opposite sides of an exposed portion of the strip externally of the entry to said duct.

In a preferred embodiment of the invention the support for the ribbon of glass is an elongated bath of molten metal contained in a tank structure, and the replenishing duct passes through a side wall of the tank structure.

The said locating means preferably comprises a bar-shaped member mounted transversely of and just above the path of travel of the upper surface of the ribbon of glass.

DESCRIPTION OF THE PREFERRED EMBODIMENTS

Figure 1:
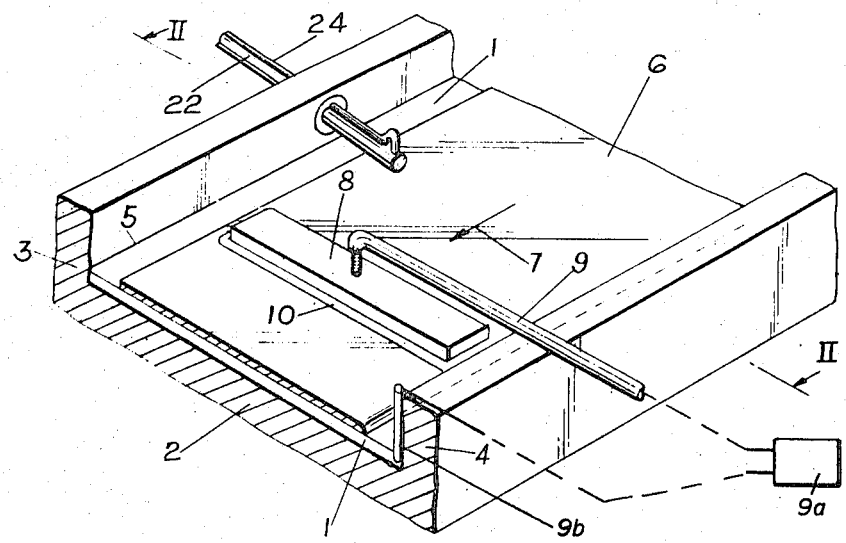
FIG. 1 is a perspective view of part of a tank structure for use in the manufacture of flat glass, and incorporating apparatus in accordance with the invention.
Figure 2:
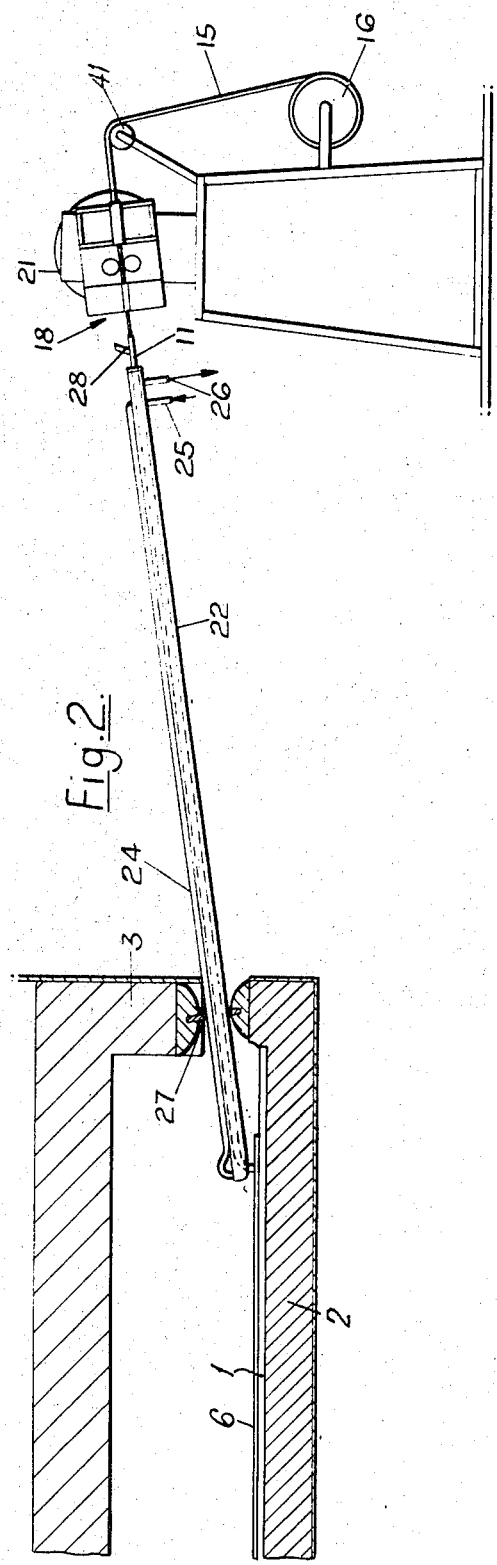
FIG. 2 is a partial cross section of the tank structure, taken in a vertical plane containing line II—II of FIG. 1, and FIGS. 3 and 4 are enlarged diagrammatic sectional views of parts of the apparatus for supplying replenishing material shown in FIG. 2.

Referring to FIGS. 1 and 2 of the drawings a tank structure containing a bath of molten metal 1 comprises a floor 2 and integral sidewalls 3 and 4. The bath 1, the surface level of which is indicated at 5, preferably comprises molten tin or a molten alloy in which tin predominates. The bath 1 is preferably so constituted as to have all the characteristics fully described in U.S. Pat. Nos. 2,911,759 and 3,083,551.

A roof structure, omitted for the sake of clarity is mounted over the tank structure and confines a tunnellike headspace over the bath 1 in which a protective atmosphere, e.g. nitrogen or a nitrogen-hydrogen mixture, is maintained as a plenum. Glass, for example soda-lime-silica glass, is fed to the bath of molten metal at a controlled rate either as a preformed ribbon of glass which undergoes a surface treatment during its advance along the bath, or as molten glass which is poured on to the bath of molten metal at a controlled rate and is permitted to flow laterally unhindered to the limit of its free flow in order to develop a buoyant body of molten glass which is advanced in ribbon form along the bath surface. The direction of advance of the ribbon of glass on the bath is indicated by the arrow 7 in FIG. 1. The temperature of the ribbon of glass is regulated as it is advanced by thermal regulators immersed in the bath 1 and mounted in the headspace over the bath, but which are omitted from the drawings of the present application for the sake of clarity.

In order to impart desired surface characteristics to the upper face of the ribbon of glass a body of molten material is maintained against the upper surface of the glass. A bar-shaped locating member 8 is mounted on a support rod 9 just above the upper surface of the glass so that a gap for example of about 3 to 4 mm. is maintained between the bottom of the bar and the path of travel of the upper surface of the ribbon of glass.

A body of molten material 10 clings to the lower face of the member 8 and is suspended from that lower surface in contact with the upper surface of the ribbon of glass. The body 10 is confined between the lower surface of the member 8 and the upper surface of the ribbon. The clinging of the body 10 of molten material to the member 8 at least partly relieves the weight of the body of molten material acting on the upper surface of the advancing ribbon and the member 8 acts as a locating means which ensures the location of the body 10 relative to the glass and prevents forward movement of the molten body with the glass.

The molten material constituting the body 10 may be a molten metal or a molten alloy. For example the metal may be tin, lead, bismuth, antimony, indium, zinc or thallium. If the molten body 10 is an alloy it may be an alloy of tin or lead or bismuth as solvent metal with a solute metal for example lithium, sodium potassium, zinc or magnesium. The member 8 is preferably of an unreactive metal, for example one of the platinum group metals. Alternatively the member 8 may comprise a base for example of copper, brass or steel or even a refractory material, which is provided with a coating of an unreactive metal, for example a ruthenium coating.

As the ribbon of glass passes continuously beneath the body of molten material its surface is modified by an element from the body 10 and this migration of an element into the glass surface can be controlled by passing an electric current between the body 10 and the glass by connecting the member 8 in an electric supply circuit 9a so as to act as an anode in an arrangement for electrolytic treatment of the upper surface of the ribbon of glass. The circuit 9a is also connected to the bath 1 through electrode 9b.

Alternatively oxidizing conditions in the body 10 of molten material may be controlled so as to control the migration of an element from the body into the glass surface.

Figure 3:
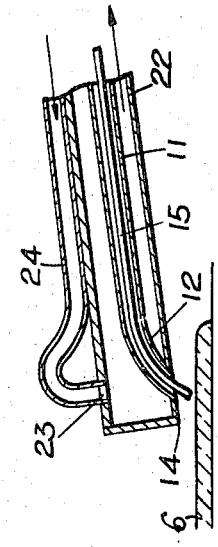

It is necessary as the treatment of the glass proceeds to replenish the body 10 of molten material with the element or elements which are entering the upper surface of the glass ribbon. For this purpose a replenishing duct in the form of a heat-resisting steel tube 11 passes through one sidewall 3 of the tank structure. The tube 11 is for the most part straight but has a downwardly curved end portion 12 in the headspace above the bath 1 which, as shown in the enlarged sectional view of FIG. 3, terminates in a mouth 14 disposed a short distance above the upper surface of the glass ribbon on the bath 1.

A continuous strip of replenishing material, conveniently in the form of a wire 15, is fed through the tube 11 to the surface of the glass ribbon by a supply apparatus located externally of the tank structure. The wire 15 is fed from a supply drum or reel 16, which is mounted so as to be freely drum or reel 16, which is mounted so as to be freely rotatable about a horizontal axis, over a guide roller 17 to a feed device 18 which is aligned with the tube 11.

Figure 4:
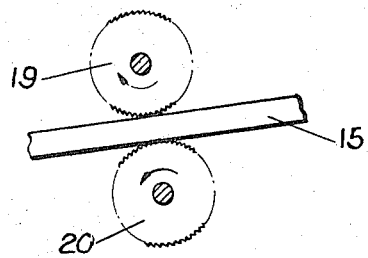

The feed device 18 includes two serrated nip rollers 19, 20 (FIG. 4) between which the wire 15 is gripped. One or both of the roller 19, 20 is driven at a controllable rate by an electric motor 21 through suitable gearing in the directions indicated by the arrows in FIG. 4. The wire 15 is drawn continuously from the supply reel 16 and pushed through the tube 11.

The tube 11 is surrounded by a hollow cylindrical cooling jacket 22 enclosing at least that part of the tube 11 which is disposed within the bath headspace, and preferably extending well beyond the sidewall 3 of the tank structure, as shown in FIG. 2. The jacket 22 is provided with an inlet 23 at its end within the headspace, the inlet 23 communicating with a coolant supply pipe 24 extending along the external surface of the jacket 22 to an inlet connection 25. A coolant outlet 26 is provided at the end of the jacket 22 adjacent the feed device 18. Coolant, most conveniently water, is circulated in the jacket 22, the coolant entering the jacket 22 through the supply pipe 24 and inlet connection 23 and leaving through the outlet 26. In this way the tube 11 is maintained sufficiently cool to prevent melting of the wire 15 passing therethrough.

The wire 15 therefore remains solid until it leaves the tube 11 through the mouth 14, whereupon melting occurs continuously at a rate directly related to the rate of feed of the wire 15 by the feed device 18. Melting may occur as the wire 15 emerges from the tube 11, so that molten material from the tip of the wire 15 drops on to the glass ribbon 6, or, with higher melting point materials, occurs where the wire 15 touches the glass. The molten material of the wire 15 is supported on and carried by the moving glass ribbon until it encounters the molten body 10, whereupon it becomes assimilated in the body 10. The body 10 is therefore replenished continuously and a a controlled rate with the material which migrates into the glass in operation of the apparatus.

A protective atmosphere, for example, nitrogen or a nitrogen-hydrogen mixture, is maintained in the headspace above the bath 1. To prevent the ingress of air and the escape of this atmosphere a diaphragm seal 27, shown diagrammatically in FIG. 2, is provided where the jacket 22 passes through the sidewall 3 of the tank structure. The supply source of the protective atmosphere (not shown) is connected to a branch duct 28 at the wire inlet and of the tube 11 to supply protective gas to the headspace through the clearance space between the tube 11 and the wire 15, thereby preventing the entry of air into the headspace through this clearance space. The flow of atmosphere through this clearance space also serves to cool the wire 15 and protect it from oxidation.

Means (not shown) may be provided for adjusting the position of the tube 11 and its surrounding jacket 22 to position the outlet 14 of the tube 11 at a desired position laterally of the ribbon to enable specific parts of the molten body 10 to be replenished.

It will be appreciated that the invention is not confined in its application to the manufacture of flat glass, but may be applied equally to the manufacture of glass articles where surface treatment of articles is effected by contact with molten bodies.

We claim:

1. A method of manufacturing float glass having desired characteristics comprising maintaining in contact with the upper surface of the floating glass body of molten material which modifies the glass by migration of an element from the body into the glass to produce the desired characteristics, which glass is at a temperature above the melting point of the material, migrating an element into the glass surface from said molten body, moving the glass and said body relatively so as to renew continuously the surface in contact with said body, feeding a strip of replenishing material towards the surface of the glass upstream of said body, cooling the strip of replenishing material along its length as it is fed, except at the end adjacent the glass surface to confine melting of the strip to the end of the strip when in close proximity to the surface of the glass, and carrying replenishing material melted from the end of the strip on the glass surface into said body of molten material.

2. A method according to claim 1, wherein the strip of replenishing material is fed continuously at a controlled rate to the glass surface.

3. A method of manufacturing float glass having desired surface characteristics, comprising maintaining a body of molten material which modifies the glass in contact with the upper surface of a ribbon of glass being advanced along a bath of molten metal and which is at a temperature above the melting point of said material, enforcing ionic migration from said body of molten material into the upper surface of the glass, and feeding a strip of replenishing material towards the surface of the glass upstream of said body, cooling the strip of replenishing material along its length as it is fed, except at the end adjacent the glass surface to confine melting of the strip to the end of the strip when in close proximity to the surface of the glass, and carrying replenishing material melted from the end of the strip on the glass surface into said body of molten material.

4. A method according to claim 3, wherein the material is fed from said strip on to the ribbon surface at a selected position transversely of the ribbon.

5. Apparatus for use in the manufacture of float glass having desired surface characteristics, comprising a molten metal support upon which a ribbon of glass may be advanced, heaters associated with the support for thermally conditioning the advancing glass, locating means mounted transversely of the support so as to be just above the path of travel of the upper surface of the advancing ribbon of glass, means for supplying molten material to a body of molten material which clings to the locating member and is held thereby in contact with the said upper surface, and means for controlling ionic migration from said body of molten material into said upper surface, said supplying means including a replenishing duct terminating just above the path of travel of the upper surface of the ribbon upstream of the locating means, a jacket surrounding the duct, means for circulating a coolant through said jacket, means for feeding a continuous strip of replenishing material through said duct and towards the said upper surface, so that the end of said strip melts only at the ribbon surface and is incorporated in said body as the ribbon advances.

6. Apparatus according to claim 5, including means for advancing the strip of replenishing material continuously along the duct at a controlled rate.

7. Apparatus according to claim 6, wherein the strip advancing means comprise a pair of nip rollers, at least one of which is driven, which are arranged to grip opposite sides of an exposed portion of the strip externally of the entry to said duct.

* * * * *